United States Patent

Dimmer et al.

[11] Patent Number: 5,924,758
[45] Date of Patent: Jul. 20, 1999

[54] ROLL ASSIST MECHANISM FOR TARP SYSTEMS

[75] Inventors: Jerry Ray Dimmer, Yankton; Bradford Paul Swanson, Utica, both of S. Dak.

[73] Assignee: Shur Company, Yankton, S. Dak.

[21] Appl. No.: 08/890,850

[22] Filed: Jul. 10, 1997

Related U.S. Application Data

[51] Int. Cl.[6] .......................................................... B60P 7/04
[52] U.S. Cl. ............................................. 296/98; 160/322
[58] Field of Search ................................ 296/98, 100.12, 296/100.15; 135/903; 160/243, 265, 266, 267.1, 268.1, 322

[56] References Cited

U.S. PATENT DOCUMENTS

| | | | |
|---|---|---|---|
| 4,302,043 | 11/1981 | Dimmer et al. | 296/98 |
| 4,484,777 | 11/1984 | Michel | 296/98 |
| 4,691,957 | 9/1987 | Ellingson | 296/98 |
| 5,002,328 | 3/1991 | Michel | 296/98 |
| 5,690,377 | 11/1997 | Denyer | 296/100.15 |

*Primary Examiner*—Dennis H. Pedder
*Attorney, Agent, or Firm*—Jones, Day, Reavis & Pogue

[57] ABSTRACT

A mechanism for assisting the rolling or unrolling of a tarp on a roll bar over the top opening of a trailer, container or similar structure. The mechanism includes an elongated, C-shaped housing, pulleys mounted at opposite ends of the housing, an elastic cord that is secured to the housing and passes about the pulleys, and a strap attached to the opposite, free end of the elastic cord for engaging an end of the roll bar. The housing, pulleys and cord are arranged so that the cord is extended when the tarp is in the open position, urging the active end of the crank to the closed position during the rolling step. The elastic cord pulls against movement at the active end of the roll bar when the bar is unrolled from the closed position to the open position.

19 Claims, 4 Drawing Sheets

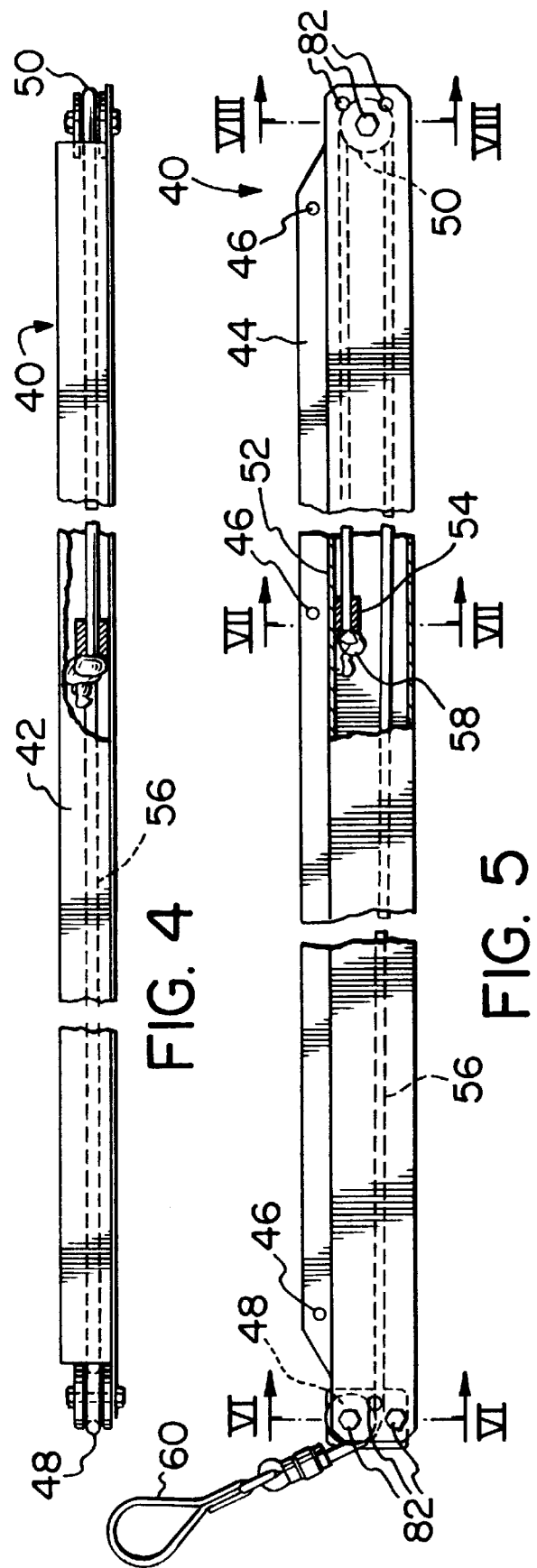

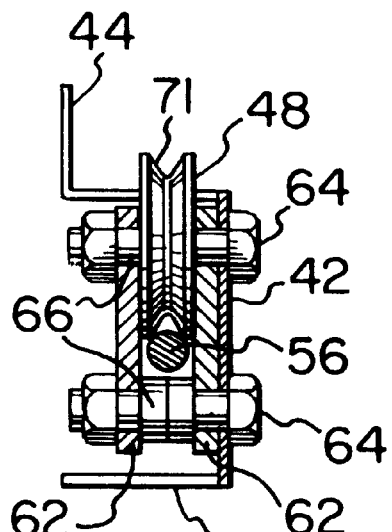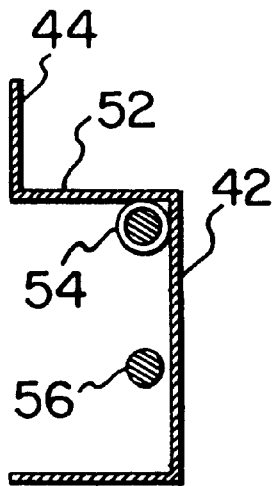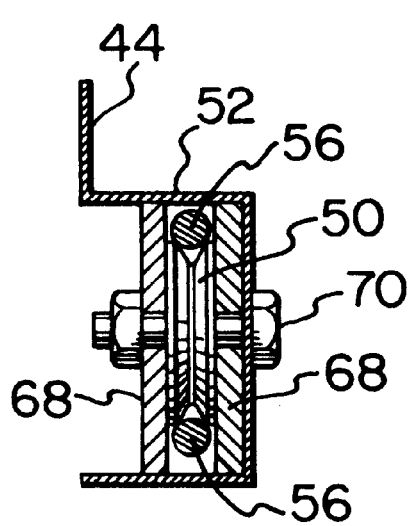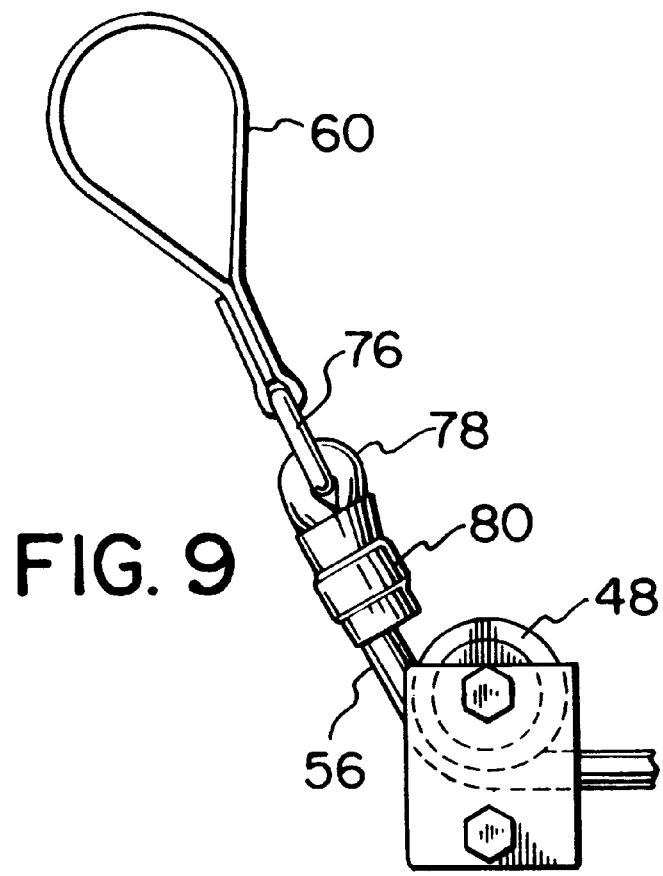

ROLL ASSIST MECHANISM FOR TARP SYSTEMS

BACKGROUND OF THE INVENTION

1. Field of the Invention

The present invention relates generally to a mechanism to assist the operation of a tarp system used to cover an open top trailer, container or similar structure. More particularly, the invention relates to mechanisms for facilitating the rolling or unrolling of a tarp between a stored, rolled up condition and the unfurled condition covering the open top.

2. Description of the Prior Art

Various types of truck, trailer and container bodies are designed to be loaded through an open top. Such bodies are typically used to haul grain, earth or refuse. It is desirable to use tarpaulins or other coverings to close the open tops of such containers. The tarpaulins serve to shelter the truck, trailer or container contents against the elements and to maintain the contents in the body when it is exposed to high winds or moved from place to place.

Several systems are known for covering truck, trailer and containers with tarpaulins. Typically, the covering is unrolled from a long tube by associated metal hardware from an open position in which the covering is entirely wrapped around the tube, exposing the interior of the container, to a closed position in which the covering is spread over the top of the container. These systems tend to use metal bows to span the width of the opening and support the covering at regular parallel spaced intervals along the length of the open top.

An example of such a system is shown in U.S. Pat. No. Re. 31,746 issued to Dimmer et al. As shown in the patent, a covering is attached along one lengthwise edge to a tube which, in turn, is connected by a universal joint to a crank. The universal joint can be removably attached to the roll tube by a spline and pin or other similar mechanism. An operator at ground level can turn the crank causing the covering to roll up lengthwise on the tube and uncover or cover the top of the trailer or container. The end of the roll tube to which the universal joint and crank arm are attached can be described as the active end because the torque or turning force is applied there. Conversely, the opposite end can be described as the passive end because the torque is applied indirectly through the length of the tube.

A feature of the system shown in U.S. Pat. No. Re. 31,746 (and the commercial embodiment thereof) is an elastic cord (item 78) attached at one end to a narrower plastic (PVC) tube within the roll tube and at the other end to a forward edge of the latch plate (or, alternatively, to the inside or outside of the body). (See U.S. Pat. No. Re. 31,746, column 4, lines 49–66.) The elastic cord pulls the passive end of the tube toward the latching side of the container to tension the end of the roll bar opposite the direct rolling force provided on the active end by the crank. The tensioning force decreases as the roll bar is moved closer to the latching side, progressively unrolling more of the covering material over the opening.

In another variation of such a system, as disclosed in U.S. Pat. No. 5,487,584 issued to Jespersen shows a series of bows that are at least partially displaceable from over the opening. In that system, the tarpaulin rolls up lengthwise along a side of the container and the bows to expose the opening. The bows can be pivoted at least partially out of the way of the container opening to increase accessibility of the interior of the body. The tarp is closed over the opening, after the bows are swung back to a position spanning the opening by unrolling the covering material from the roll bar across the top in a conventional manner.

In some circumstances, the use of the resilient cord at the passive end of the roll bar causes the passive side to be advanced at a different rate across the opening than the rate of the active end of the roll bar. In essence, the pulling by the elastic cord applies a different force applied in a different direction than the turning/rolling force applied directly at the opposite end by the crank arm. During the opening operation, the imbalance of forces can cause the covering material to be wrapped more tightly around the passive side of the bar or tube than the material on the active side. This will result in the passive side progressing more slowly than the active side. Conversely, the passive side tends to advance faster than the active side of the roll or tube during the closing operation, occasionally resulting in stationary unwinding of the covering on the bar at the active end. Such uneven rolling may cause the operator to try to use the crank arm to slide, push or pull the roll bar and associated covering material to advance the active end of the roll bar, or to move it over a heaped load or other blockage, for example.

It is an object of the invention to provide an assist mechanism for a tarp system whereby a more equal balance of tension forces applied to the roll bar is achieved. It is another object of the invention to provide an apparatus where uneven unrolling is less likely to occur or is avoided altogether. It is a further object of the invention to provide supplemental tension for a tarp system to increase total tension forces at the roll bar of a roll-up tarp system. Still further it is desirable to provide an assist mechanism which may be retrofitted readily to existing covering apparatus to improve the rolling operation.

SUMMARY OF THE INVENTION

The present invention provides a roll assist mechanism at the active end of the roll bar or tube of a roll-up tarp system. The basic roll tarp system for which the mechanism typically will be used includes a tube to which an edge of a tarpaulin cover is attachable. A crank shaft and crank assembly are attached on the active end of the tube to rotate the tube and roll up or unfurl the associated cover. The inventive additional apparatus comprises a generally elongate housing that is attachable to an upper rear edge of the container body near the active end of the roll bar. Pulleys are mounted on the first and second ends of the housing. An elastic cord is disposed within the housing, perpendicular to the roll bar, and has a first end attached to the interior of the housing. The cord passes over the pulleys, extending a distance greater than the entire length of the housing, and has a second free end. A strap is provided on the free end to be slipped over the active end of the roll bar, connecting the cord to the crank shaft.

As the roll bar rolls up the covering, the cord is extended with increasing tension. Hence, when the roll bar is rolled to close the covering over the opening, the material is unfurled from a rolled up condition and the tensioned cord assists in drawing the tube across the top of the container. Because the front and rear tensions are generally balanced in force and direction, the tarpaulin will unroll relatively evenly from both front passive and rear active ends of the roll bar. Manual pulling or pushing on the active end by the operator will be less likely to be needed.

BRIEF DESCRIPTION OF THE DRAWINGS

The foregoing and other novel features and advantages of the invention will be better understood upon a reading of the following detailed description taken in conjunction with the accompanying drawings wherein:

FIG. 4 is a top plan view of the inventive apparatus;

FIG. 5 is an elevational view of the inventive apparatus;

FIG. 6 is a cross-sectional view taken substantially along the line 6—6 of FIG. 5;

FIG. 7 is a cross-sectional view taken substantially along the line 7—7 of FIG. 5;

FIG. 8 is a cross-sectional view taken substantially along the line 8—8 of FIG. 5; and FIG. 9 is a partial elevational view showing the attachment arrangement for the elastic cord of the roll assist mechanism.

DETAILED DESCRIPTION OF THE PREFERRED EMBODIMENTS

Figure 1:
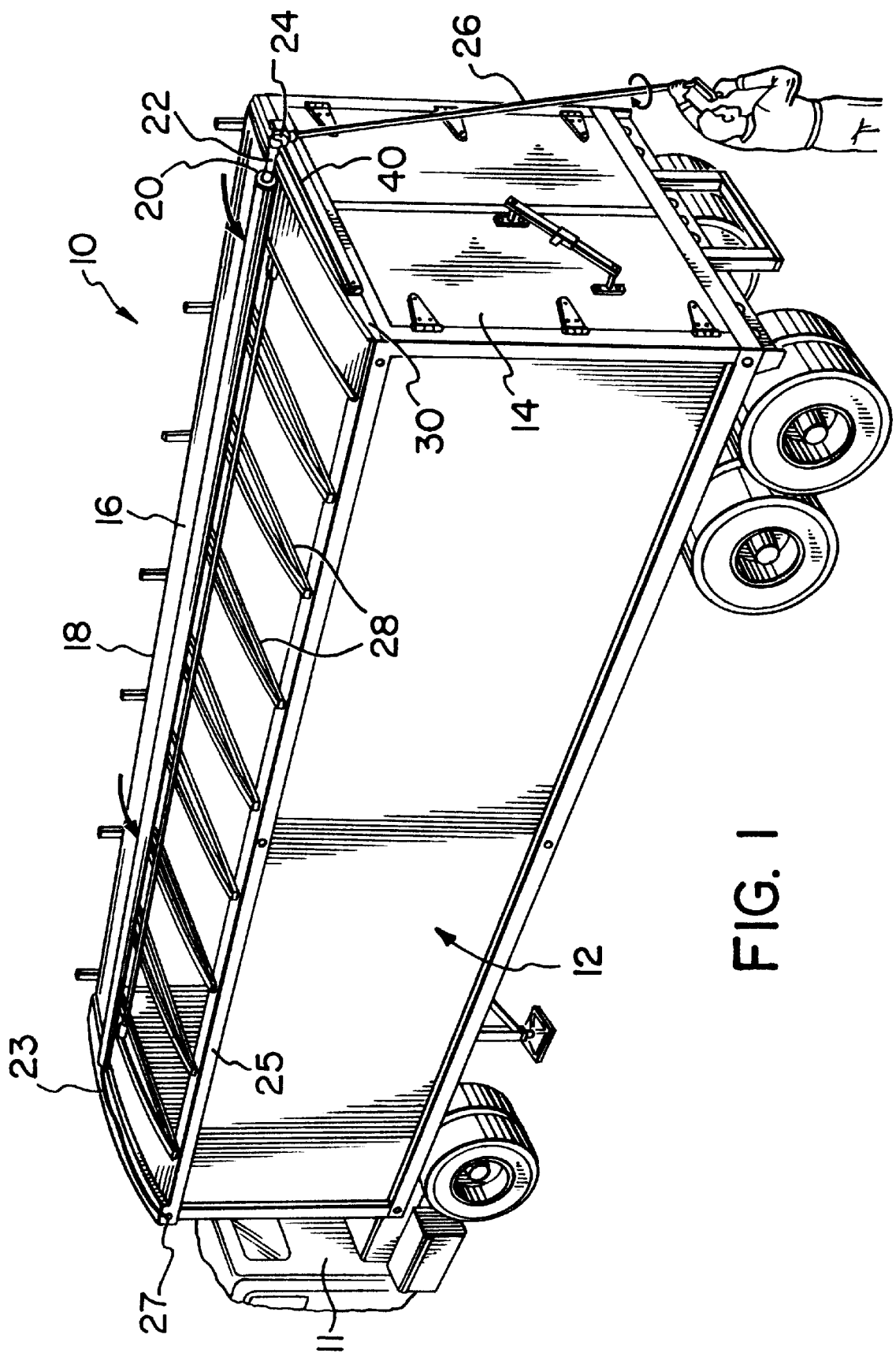
FIG. 1 is a rear perspective view of a truck trailer having a side-to-side roll-up tarp system, employing the inventive apparatus for tensioning the active end of the roll bar.
Figure 2:
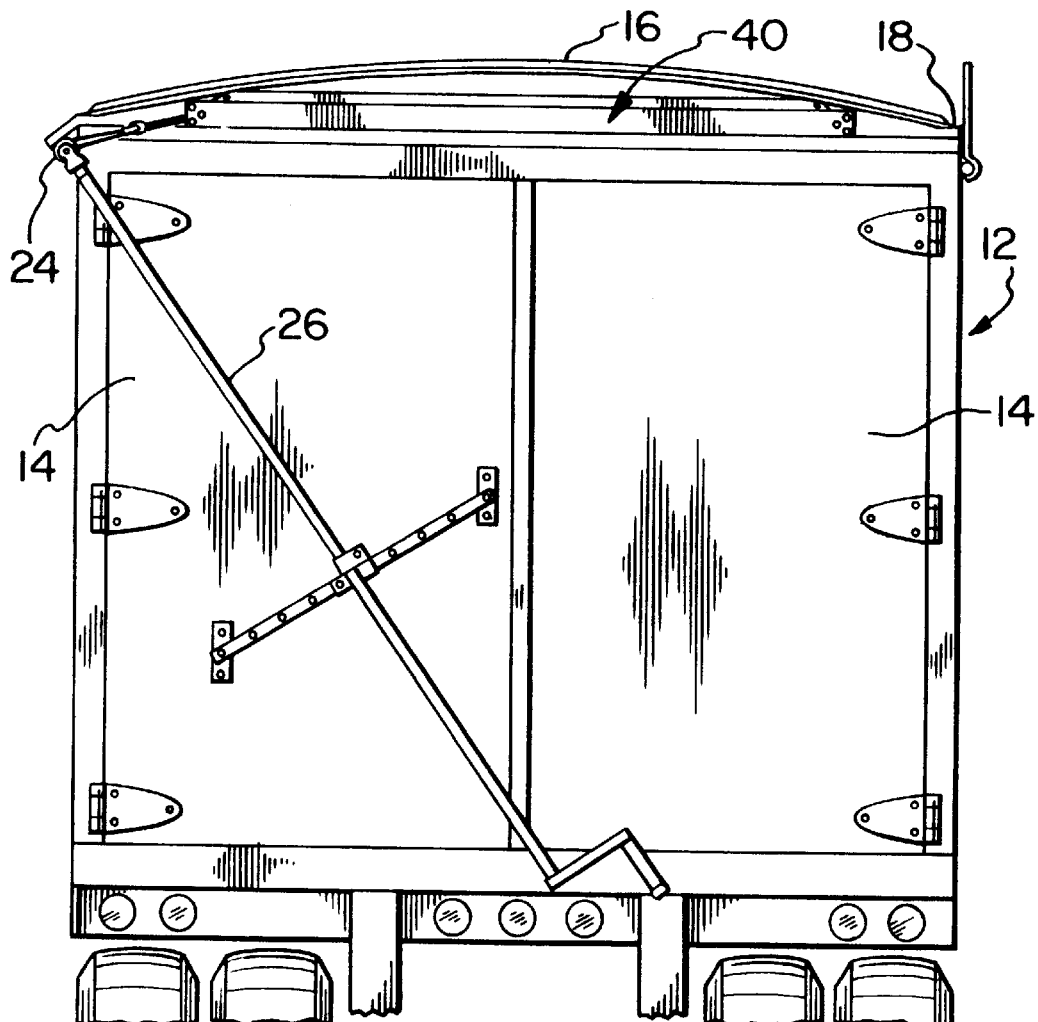
FIG. 2 is a rear view of the truck trailer and tarp system of FIG. 1.

Referring now to the drawings, and initially to FIGS. 1 and 2, a truck trailer is designated generally by the reference numeral 10 and includes as principal components a truck cab 11 for pulling a container and an open top container 12. The container 12 is particularly suitable for hauling grain, earth, refuse, or the like, which generally is loaded into the container 12 through the open top. Generally material is removed from the container 12 through the top, a trap door in the floor (not shown), or rear doors 14. A similar trailer construction is shown in U.S. Pat. No. Re. 31,746, the disclosure of which is incorporated in its entirety by reference herein.

The illustrated container 12 is provided with a cover system to protect the contents from the elements such as rain, sleet, snow or hail, and to ensure that they are retained within the container 12 during high winds produced by weather or by movement of the trailer. The cover system shown in the FIGS. and described herein is merely one example of a tarp system that can be improved by addition of the inventive roll assist mechanism. The specific example used herein includes a roll up covering or tarp 16 which may be constructed of vinyl, canvas or other flexible materials. The covering 16 is secured to the container 12 along a first lengthwise edge 18 by metal hardware known in the art. (See, for example, U.S. Pat. No. Re. 31,746.) A free, lengthwise edge of the tarpaulin is secured to a roll bar or tube 20. The tube 20 is fitted at its rear active end with a crank shaft 22 connected to a universal joint 24. A manual crank assembly 26 is, in turn, connected to the universal joint 24.

Suitable bows 28 span the width of the container 12 at spaced intervals to support the covering 16 over the container 12 when the covering 16 is in a deployed condition. As illustrated in FIG. 1, an operator may manually turn the crank assembly 26 causing the covering 16 to be rolled up on the tube 20 thereby uncovering the container 12. When rolled in the opposite direction the covering material is unfurled over the open top. A resilient cord 23 is attached at one end to the latch plate 25 at hole 27 and at the other end of the roll bar or tube 20 opposite to the end of the tube connected to the crank assembly 26, referenced to herein as the passive end of the roll bar. The specifics of the connection are described in U.S. Pat. No. Re. 31,746, column 4, lines 49 et seq., incorporated by reference herein. In accordance with the invention, an upper rear edge 30 associated with the trailer body is provided with a roll assist mechanism, designated generally by the reference numeral 40, in greater detail below. For purposes of this patent application, the term body also includes end caps which may be attached to the truck, trailer, container or the like.

Figure 3:
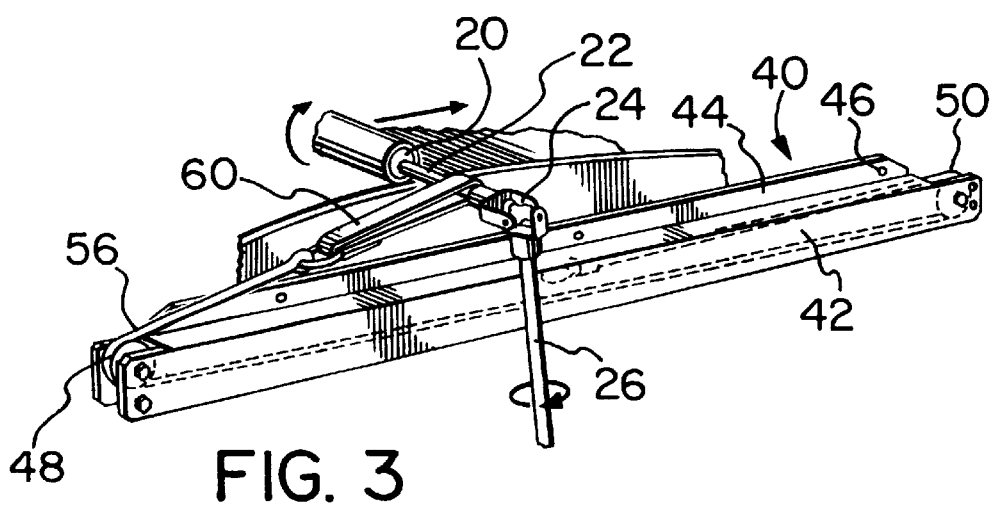
FIG. 3 is a rear perspective view showing greater detail of the roll assist apparatus constructed in accordance with the principles of the invention.

Turning now to FIGS. 3, 4 and 5 the roll assist mechanism 40 can be seen to include an elongate, generally rectangularly C-shaped housing 42 having an upstanding flange 44 provided with spaced apertures 46 for attachment of the housing 42 to an upper rear edge 30 of the container 12. The housing 42 may be formed from stamped sheet metal. The length of the housing is preferably two-thirds to three-fourths the width of the vehicle body. Alternatively, it could be shorter. At opposed ends, the housing 42 is provided with pulleys 48 and 50 preferably oriented to roll in a plane perpendicular to the length of the roll bar, but alternatively in any other direction. Preferably one pulley wheel is located near each end of the housing but, alternatively, multiple wheels could be provided at each end or at intermediate points to increase the effective travel distance of the cord across the housing and through the pulleys. Such a configuration might allow for a much shorter housing than shown as the preferred embodiment.

Disposed approximately midway between the two housing ends and secured as by welding to interior wall 52 of the housing 42 is a cylindrical passage or bushing 54. A stretch cord 56, disposed internal to the housing 42, passes through the cylindrical bushing 54, travels a significant portion of the length of the housing to the first pulley 50, around the first pulley 50, passes the full length of the housing 42, and exits the housing 42 after passing over the second pulley 48. The cord 56 at the cylindrical bushing 54 the cord 56 is provided with a knot 58 to trap the first end of the cord 56 against movement as a result of extension of the opposite, second end. The use of this arrangement allows easy adjustment of the cord length and easy cord replacement. Alternatively, the first end of the cord 56 can be attached to the interior or exterior of the housing in any known method for attaching an elastic piece to metal. The second end of the cord is connected to a strap 60, as will be more fully described below. As shown in FIG. 3, the strap 60 is passed around and carried with the active crank shaft 22 end of the tube 20.

Use of a housing that is nearly the full width of the trailer, and pulleys at either end, provides a substantial distance for the cord to travel before it departs the housing and is attached to the roll bar. This is one of the advantages of the design of the inventive roll assist mechanism. The cord may be slightly extended or in a completely non-tensioned condition when the covering is unfurled over the open top and the roll bar is in the secured position. During the opening operation, the cord will be extended the entire width of the box. The length of the cord is normally less than doubled when fully extended and the system is in the open position. The travel distance of the cord through the housing and over the pulleys in an non-stretched condition, will be about the same or somewhat greater than the width of the trailer, requiring an extension of the cord only to about 150%–200% of its unextended length and preferably about 180%. This will avoid the application of exceedingly large increases in pulling power as the roll bar is moved across the width of the trailer or the need to use an extension means with unusual stretch characteristics.

Preferably, 15–30 pounds of pressure will be applied by the cord when the roll bar is in the position associated with full exposure. In this circumstance, a total preferred pressure of 30–60 pounds is applied to the roll tube, balanced relatively evenly between the two ends of the tube.

FIGS. 6 and 8 show the mounting of the pulley wheels 48 and 50, respectively. As shown in FIG. 6, the pulley wheel 48 is preferably mounted to the housing 42 by a pair of spaced plates 62 secured to the housing 42 by two bolts 64. The plates 62 are separated by suitable spacers 66 which provide space for the pulley 48 to turn freely within them. The uppermost bolt 64 and spacer 66 serves to journal the pulley wheel 48 such that the pulley extends above the upper wall 52 of the housing 42 and the cord 56 enters the second pulley 48 just below the longitudinal housing centerline. As shown in FIG. 8 the pulley wheel 50 is mounted between two spaced plates 68 connected by a single central bolt 70 to the housing 42. Like the pulley 48, the pulley 50 is journalled by the bolt 70 and a spacer (not shown) so as to rotate freely between the plates 68. The central mounting of the pulley 50 within the housing 42 permits the cord 56 to reversely pass around the pulley 50 within the housing 42. The pulley wheels contain a groove 71 dimensioned to receive cord 56.

Referring now to FIG. 9, the strap 60 can be seen as attached to the cord 56 by a D-ring 76 through which is held by a loop 78 of the cord 56. The loop 78 may preferably be formed by reversely bending the cord 56 end and securing it to itself by a pair of hog rings (not shown). A heat shrinkable tube segment 80 of rubber or plastic may be provided to further secure, conceal and protect the end of this cord 56 and associated connectors or hog rings.

Another feature of the invention, as best seen in FIG. 5, is that the housing ends are each provided with identically configured apertures 82. By this arrangement the plates 62 and 68 and pulleys 48 and 50 are easily reversed from one end of the housing 42 to the other. Further, the cord 56 may be untied at the bushing 54 and reversed in direction. Thereby, the assist mechanism 40 may readily be configured for either right-hand or left-hand roll up of the covering 16.

It can now be appreciated that a roll assist mechanism 40 constructed according to the invention provides a highly effective means for assisting in both rolling up and unrolling a covering evenly across the length of the roll bar. Thus, the need for an operator to manually push or pull the active end of the roll bar to adjust or straighten the covering is minimized or eliminated altogether. The inventive mechanism 40 is effective when used with a roll tarp system of the type described above and/or shown in U.S. Pat. No. Re. 31,746 but also will provide helpful tension in other roll tarp systems. The mechanism can be manufactured from available components and is adaptable for retrofitting existing containers or systems. To install the mechanism 40 it is only necessary to drill three holes in an upper rear edge of a container or end cap, disconnect the crank assembly, slip the strap 60 over the active end of the roll bar, and reconnect the crank assembly.

While the present invention has been described in connection with preferred embodiments thereof, it will be apparent to those skilled in the art that many changes and modifications may be made without departing from the true spirit and scope of the invention. Accordingly, it is intended by the appended claims to cover all such changes and modifications as come within the true spirit and scope of the invention.

What is claimed is:

1. A roll assist apparatus for a tarp system, the system including a covering over an opening in the top of a body, the covering being attached on one side to the body and on the other side to a roll bar, the roll bar being turned by a force applied at one end of the bar, the apparatus comprising:

an elongated support attachable to an end portion of the body, the end portion being disposed at a substantially right angle to the roll bar;

resilient means for applying a tension force against stretching movement, the resilient means having two ends, the first end being immovably secured to said support when the second end is extended;

pulley means mounted on the support for receiving the resilient means and allowing stretching of the resilient means thereabout; and, connection means attached to the second resilient means end for connection of the resilient means to the end of the roll bar to which force is applied;

wherein the resilient means is operable to urge the roll bar to pass over the opening in the top of the body and unroll the covering over the opening.

2. The roll assist apparatus of claim 1 wherein the support has two ends and the means for receiving the resilient means are two pulley wheels mounted on the support, one adjacent each end.

3. The roll assist apparatus of claim 2 wherein the support includes a housing portion having a U-shaped cross-section and the pulley wheels are mounted on an interior wall of the housing portion.

4. The roll assist apparatus of claim 3 wherein the resilient means is an elastic cord.

5. The roll assist apparatus of claim 3 wherein the housing portion has a length approximately three-quarters of the width of the body.

6. The roll assist apparatus of claim 4 including means for attaching the first end of the cord to an interior wall of the housing and wherein the cord is capable of stretching to at least twice its unextended length.

7. A roll tarp system for an elongated body having an elongated opening, the system comprising:

a flexible covering having a longitudinal dimension approximately corresponding to the longitudinal dimension of the opening and having a lateral dimension greater than the lateral dimensions of the opening;

means attaching one longitudinal edge of the covering adjacent one longitudinal edge of the opening;

a roll bar connected to the covering adjacent a second longitudinal edge of the covering;

crank means operatively connected to one end of the roll bar for rolling the roll bar transversely of the body for rolling or unrolling the covering;

resilient means for applying tension to the roll bar, the resilient means being generally elongate and having first and second ends;

means for fixedly attaching the first end of the resilient means to a surface portion of the body disposed generally at right angles to the roll bar;

pulley means for receiving the resilient means from a first direction and allowing extension of the resilient means in a second direction; and connection means for connecting the second end of the resilient means to the roll bar;

wherein the resilient means is operative to urge the roll bar to an unrolled condition of the covering.

8. The roll tarp system of claim 7 wherein the means for fixedly attaching the first end of the resilient means to the surface portion of the body includes an elongated support with two ends, and wherein the pulley means includes two pulley wheels mounted on the support, one adjacent each end.

9. The roll tarp system of claim 8 wherein the support has a housing portion having a generally U-shaped cross-section and the pulley wheels are mounted on an interior wall of the housing portion.

10. The roll tarp system of claim 9 wherein the housing portion has a length approximately three-quarters of the width of the body.

11. The roll tarp system of claim 10 wherein the first end of the resilient means is attached to an interior wall of the housing portion and the resilient means is capable of stretching to at least twice its unextended length.

12. The roll tarp system of claim 11 wherein the resilient means is an elastic cord that will exert 15–30 pounds of tension when the material is in the rolled condition.

13. A vehicle having an elongated top opening, the vehicle comprising:

means for moving the vehicle from place to place;

a roll tarp system including a flexible covering having a longitudinal dimension approximately corresponding to the longitudinal dimension of the opening;

means attaching one longitudinal edge of the covering adjacent one longitudinal edge of the opening;

a roll bar connected to the covering adjacent a second longitudinal edge of the covering;

crank means operatively connected to one side of the roll bar for rolling the bar transversely of the body for rolling or unrolling the covering;

resilient means for applying tension to the roll bar, the resilient means being generally elongate and having first and second ends;

means for fixedly attaching the first end of the resilient means to a surface portion of the body disposed generally at right angles to the roll bar;

pulley means for receiving the resilient means from a first direction and allowing extension of the resilient means in a second direction; and connection means for connecting the second end of the resilient means to the roll bar;

wherein the resilient means is operative to urge the roll bar to an unrolled condition of the covering.

14. The vehicle of claim 13 wherein the means for fixedly attaching the first end of the resilient means to the surface portion of the body includes an elongated support with two ends, and wherein the pulley means includes two pulley wheels mounted on the support, one adjacent each end.

15. The vehicle of claim 14 wherein the support has a housing portion having a generally U-shaped cross-section and the pulley wheels are mounted on an interior wall of the housing portion.

16. The vehicle of claim 15 wherein the housing portion has a length approximately three-quarters of the width of the body.

17. The vehicle of claim 16 wherein the resilient means is a cord and the first end of the cord is fixedly attached to an interior wall of the housing portion, the cord being capable of stretching to at least twice its unextended length.

18. A method for assisting the unrolling of a covering from a roll bar as an opening is being covered by a roll tarp system, the tarp system being of the type including a flexible covering material having a longitudinal dimension approximately corresponding to the longitudinal dimension of the opening and having a lateral dimension greater than the lateral dimension of the opening, means attaching one longitudinal edge of the covering adjacent one longitudinal edge of the opening, a bar member connected to the covering adjacent a second longitudinal edge of the covering, and crank means operatively connected to one end of the bar member for rolling the bar member transversely of the body for rolling or unrolling the covering, the method comprising:

securing a generally elongate support member having opposed ends to a surface portion of the body disposed generally at a right angle to the bar member, the support member supporting a pair of pulleys for rotation thereon with one pulley disposed adjacent each end of the support member;

providing a generally elongate resilient member having opposed ends;

securing a first end of the resilient member to the support member;

passing the resilient member around the pulleys such that the second end of the resilient member is directed toward the bar member; and attaching the second end of the resilient member to the one end of the bar member thereby applying tension by application of force by the resilient member to the one end of the bar member during unrolling of the covering as the opening is being covered.

19. The method of claim 18 wherein two resilient members are used, one of which is secured between the end of the bar member opposite the crank means and the body, and the other of which is secured between the crank means end of the bar member and the support member.

* * * * *